United States Patent [19]

Linder et al.

[11] 4,356,996

[45] Nov. 2, 1982

[54] HIGH PRESSURE GLOBE AND CHECK VALVE

[75] Inventors: Morris B. Linder; John J. Beffano, both of Houston, Tex.

[73] Assignee: Quality Valve and Machine Works, Inc., Houston, Tex.

[21] Appl. No.: 191,663

[22] Filed: Sep. 29, 1980

[51] Int. Cl.³ ............................................. F16K 15/18
[52] U.S. Cl. ................................. 251/82; 137/533.17; 251/113; 251/332; 251/363
[58] Field of Search ................. 251/82, 264, 297, 318, 251/332, 360, 111, 113, 363; 137/533.17, 533.21

[56] References Cited

U.S. PATENT DOCUMENTS

| 345,197 | 7/1886 | Wade | 251/82 |
|---|---|---|---|
| 589,142 | 8/1897 | Roseberry | 251/82 |
| 963,836 | 7/1910 | Varlie | 251/82 |
| 1,001,111 | 8/1911 | Wood | 251/82 |
| 1,369,444 | 2/1921 | Koplin | 251/82 |
| 1,796,252 | 3/1931 | Greve | 137/533.17 |
| 1,910,994 | 5/1933 | Joyce | 251/82 |
| 2,091,874 | 8/1937 | Neuhaus | 251/297 |
| 2,521,314 | 9/1950 | Therolf | 251/332 |
| 3,053,500 | 9/1962 | Atkinson | 251/332 |

*Primary Examiner*—George L. Walton
*Attorney, Agent, or Firm*—Gunn, Lee & Jackson

[57] ABSTRACT

A high pressure globe and check valve mechanism according to the present invention incorporates a valve body structure having a globe valve type seat removably positioned therein. A globe type valve element is adapted for seating engagement with respect to the removable seat and is positionable within the valve body by means of a valve actuating stem. A connection element establishes a lost-motion connection between the valve element and valve stem and thus allows relative movement between the valve element and valve stem during check valve type operation. The valve stem is also positionable within the valve body structure so as to maintain the valve element in positive seated engagement with respect to the valve seat.

11 Claims, 2 Drawing Figures

HIGH PRESSURE GLOBE AND CHECK VALVE

FIELD OF THE INVENTION

This invention relates generally to high pressure valve mechanisms and is more specifically directed to a valve mechanism which may be employed to accomplish check valve operation and which may also be employed to accomplish sealing regardless of the flow through the valve. Even more specifically, the present invention relates to a valve mechanism which may be incorporated within a high pressure manifold system such as a choke manifold that is typically utilized in the petroleum industry.

BACKGROUND OF THE INVENTION

In fluid handling systems, especially where extremely high pressures are encountered, for example, pressures in the order of 10,000 psi, the valve mechanisms that are typically employed in such service typically take the form of gate valves. In some cases it is desirable to provide a high pressure valve mechanism having not only a positive sealing capability but also a capability of relieving pressure in the event an opposing pressure surge should develop. Gate valves are typically utilized under circumstances where positive sealing capability is desired and are not used under circumstances where a back surge relieving capability is also desired. Gate valves typically are positionable only in open or closed positions and when closed establish positive sealing with respect to flow from either direction.

In order to accomplish a check valve function for the purpose of relieving surges of pressure or to provide for unidirectional flow through a conduit system controlled by a valve mechanism, check valve mechanisms are typically employed. In most cases, however, check valves only function to provide unidirectional flow control and are not capable of functioning in the conventional open and closed positions in order to provide for bidirectional flow control. Moreover, most check valve mechanisms are of low pressure characteristics and would not typically be employed under circumstances where fluid pressures are in the order of 10,000 psi or higher. It is desirable, therefore, to provide a valve mechanism having the capability of withstanding high pressure conditions and also providing the capability of functioning to provide bidirectional fluid control and to selectively provide a relieving function in the event reverse pressure surges should occur. It is also desirable to provide a valve mechanism having the capability of establishing positive sealing in the event a check valve relieving function is not desired.

Especially under circumstances where liquid is being handled by a flow line system that is controlled by means of gate valves, it is possible for sections of the flow line system to be isolated between two closed gate valves. In some cases, flow conduit systems that are so isolated can develop extremely high pressures in response to heating and cooling thereof by the ambient environment. For example, when an isolated liquid flow line becomes heated, heat expansion of the liquid material can cause extremely high pressure conditions to be developed. It is desirable, therefore, to provide means for relieving pressures that develop in this manner so as to provide the flow system with a pressure responsive safety mechanism to protect equipment, personnel and the environment.

SUMMARY OF THE INVENTION

It is therefore a primary feature of the present invention to provide a novel valve mechanism such as might be employed in choke manifolds or other high pressure fluid controlled environment and wherein the valve mechanism has the capability of selectively providing for unidirectional or bidirectional flow control.

It is another feature of this invention to provide a novel valve mechanism having high pressure fluid handling capability and also having the capability of relieving pressure in the event of excessive pressure increase in certain portions of the fluid handling system being controlled by the valve mechanism.

It is an even further feature of this invention to provide a novel valve mechanism having selective capability of functioning in a check valve sense or functioning in positive pressure sealing by means of simple manual selection.

Among the several features of this invention is contemplated the provision of a novel high pressure valve mechanism which incorporates a valve and seat system having the capability of accommodating pressure induced slamming under high pressure conditions without resulting in damage to the valve element or seat.

It is also a feature of this invention to provide a novel high pressure valve mechanism of the character described above, which valve mechanism is of simple nature, is reliable in use and low in cost.

Other and further objects, advantages and features of the invention will become obvious to one skilled in the art upon an understanding of the illustrative embodiment about to be described, and various advantages, not referred to herein, will occur to one skilled in the art upon employment of the invention in practice.

Briefly, the valve mechanism of this invention incorporates a valve body structure defining a valve chamber and having inlet and outlet flow passages in communication with the valve chamber. A valve stem that is movably supported by a bonnet structure that is maintained in sealed assembly with respect to the valve body is linearly movable within the valve chamber in order to provide for controlled positioning of a valve element with respect to a valve seat structure. The valve element and seat structure are of the globe valve type wherein the valve element moves directly into abutting seated relation with respect to a seat surface defined on the seat element. Depending upon the position of the valve stem within the valve chamber, the valve and seat assembly is adapted for either bidirectional or unidirectional fluid handling capability. The valve stem is positionable to maintain the valve element in positive seated engagement with respect to the sealing surface of the seat, thereby providing positive closure capability. The valve stem is also positionable to allow for bidirectional flow control and to provide a check valve capability in the event such is desired. The valve stem and valve element are interconnected by means of a lost-motion type connection that allows a certain amount of linear movement of the valve element relative to the valve stem. This linear movement allows the valve element to shift and relieve pressure in the check valve mode while the valve stem remains stationary.

The valve mechanism incorporates a seat structure which is adapted to be received within a tapered passage formed in the valve body and which is formed to define an annular tapered, essentially frusto-conical seating surface which is engaged by a mating sealing element that defines a part of the valve element. The mating sealing element may be composed of a synthetic polymer material such as polytetrafluoroethylene or the like for optimum seating engagement with respect to the annular seat surface.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and therefore are not to be considered limiting of its scope, for the invention may admit to other equally effective embodiments.

In the Drawings

DETAILED DESCRIPTION OF PREFERRED EMBODIMENT

Figure 1:
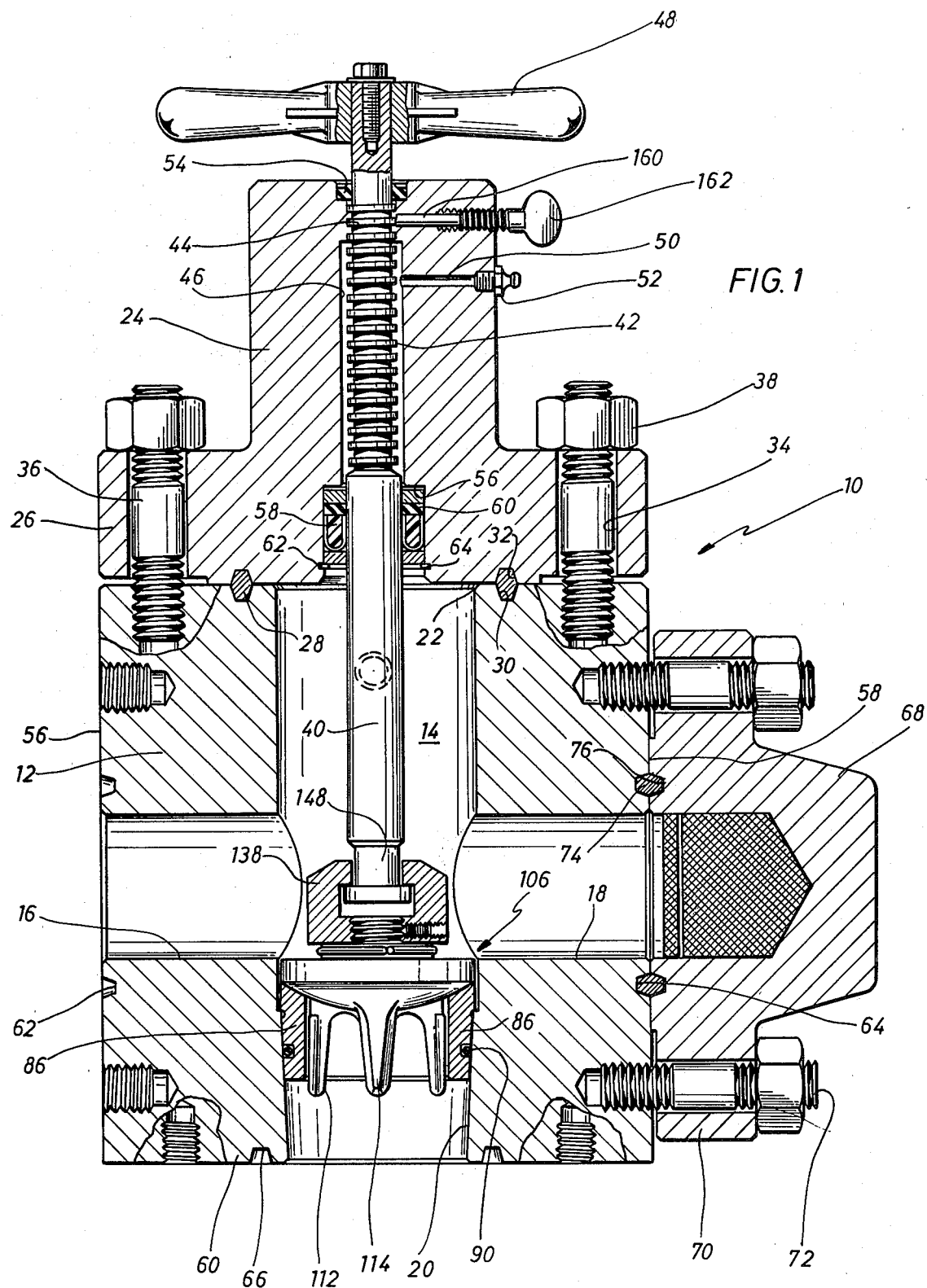
FIG. 1 is a sectional view of a high pressure valve mechanism constructed in accordance with the present invention.

Referring now to the drawings and first to FIG. 1, a valve mechanism is illustrated generally at 10 which basically comprises a valve body structure 12 which is formed to define a centrally oriented valve chamber 14 which is transversely intersected by flow passages 16 and 18 and which is also intersected by an inlet passageway 20. The valve body structure is formed to define an opening 22 for the valve chamber, which opening is closed by means of a bonnet structure 24. The bonnet structure 24 incorporates a bonnet flange 26 that is maintained in sealed relationship with respect to the valve body 12 by means of an annular sealing element 28 that is maintained within a seal chamber formed by opposed seal grooves 30 and 32 formed respectively in the valve body and bonnet flange structures. The bonnet flange is also formed to define a plurality of bolt openings 34 through which a plurality of studs 36 extend. Nuts 38 are threadedly received by the studs 36 and are tightened onto the threaded studs sufficiently to retain the bonnet structure 24 in positively sealed relationship with respect to the valve body.

To provide for actuation of the valve mechanism, an elongated valve stem 40 extends into the valve chamber 14 and is provided with an upper externally threaded portion 42 that is received by internal threads 44 defined within a stem passage 46 extending through the bonnet structure. As the valve stem 40 is rotated by means of a handwheel or handle 48 connected at the outer extremity thereof, the interengaging threads 42 and 44 induce linear movement to the valve stem. For lubrication of the threaded connection between the valve stem and bonnet, the bonnet structure is formed to define a lubricant passage 50 having an Alemite fitting 52 closing the outer portion thereof. A suitable lubricant injecting device may be secured to the Alemite fitting for the purpose of introducing lubricant into the passage 46. A seal element 54 is provided at the outer portion of the stem passage 46 and provides a seal to prevent dust, sand and other contaminants from entering the stem passage and interfering with operation of the threaded valve actuating mechanism.

Although a particular valve actuating mechanism has been illustrated, it should be borne in mind that the present invention is not in any way restricted to utilization of a threaded connection as shown. It is intended that any other suitable valve mechanism may be utilized within the spirit and scope of this invention to impart reciprocating movement to the valve stem 40.

In order to prevent leakage of pressure from the valve chamber 14 along the valve stem and through the valve stem passage, the bonnet structure 24 is formed to define an annular packing chamber 56 within which is received a packing assembly 58 which may take any one of a number of convenient forms within the spirit and scope of this invention. As shown, the packing assembly 58 incorporates a U-shaped packing element 58 which is interposed between a packing follower 60 and a junk ring 62. The packing assembly 58 is retained within the packing chamber or receptacle 56 by means of an annular packing retainer ring 64 which is received within an annular internal groove formed within the packing chamber portion of the bonnet 24.

The valve body structure 12 is formed to define a plurality of sealing faces such as shown at 56, 58 and 60 with seal ring grooves 62, 64 and 66 formed concentrically about respective passages 16, 18 and 20. As shown at the right-side portion of FIG. 1, the valve body opening defined by passage 18 may be closed by means of a blind flange structure 68 having a flange portion 70 that may be secured by stud and nut assemblies 72 to the valve body structure. An annular ring-type sealing element 74 is received within a seal chamber defined by opposed seal grooves 64 and 76 and serves to form a positive seal between the blind flange structure and valve body. In the event it is desired that both flow passages 16 and 18 be open during valve operation, the blind flange structure 68 may be removed and flanges of flow lines may be secured to the respective sealing faces 56 and 58. Also, the blind flange structure 68 may be interconnected in sealing engagement with sealing face 56 in the event only the flow passage 18 is intended to be open with respect to a flow line. By employing a blind flange in this manner, the valve mechanism is of universal nature and can be connected into flow systems of various design.

Figure 2:
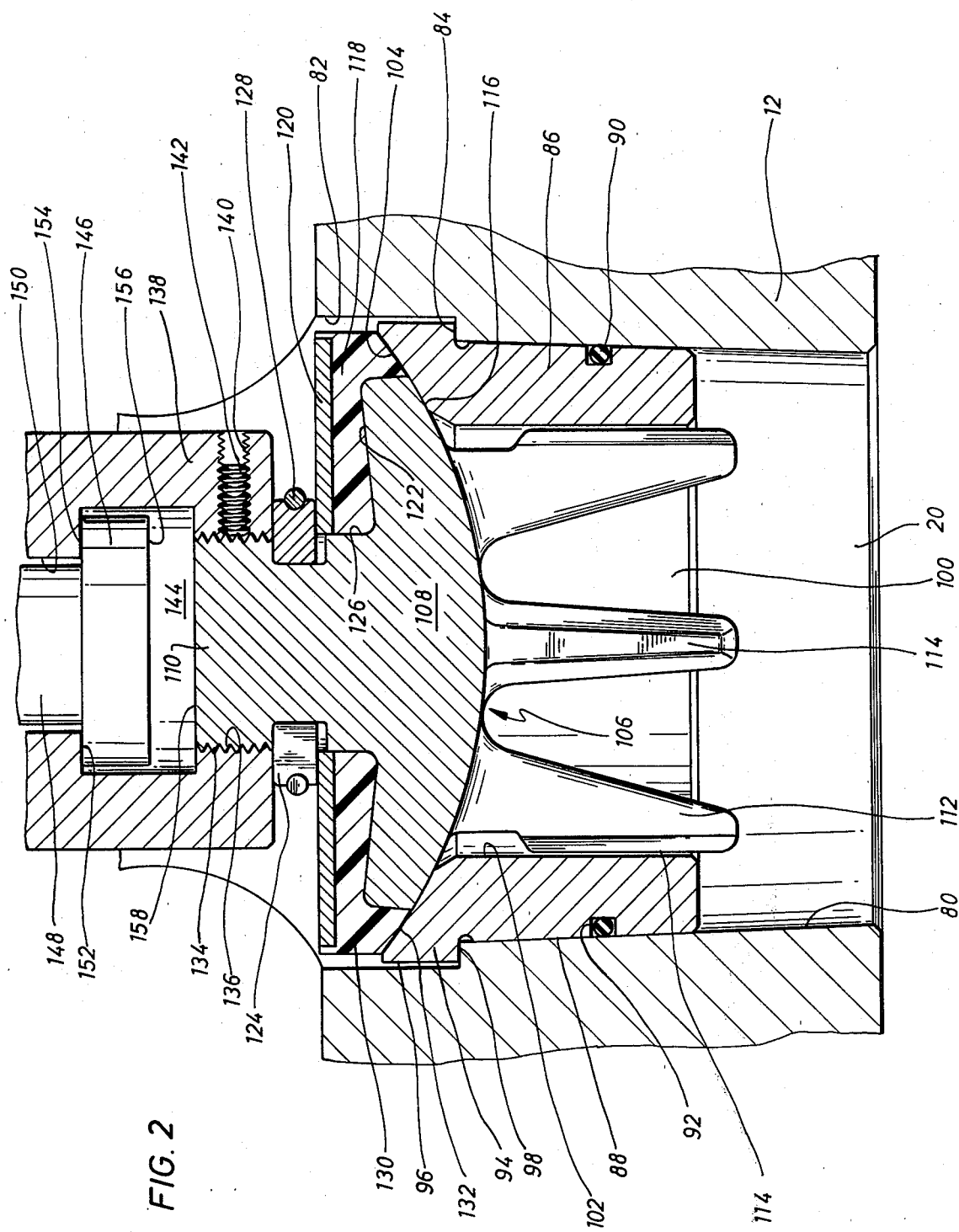
FIG. 2 is a fragmentary sectional view of the valve mechanism of FIG. 1, illustrating the seat and valve element structures thereof in detail.

Referring now to FIG. 2, the flow passage 20 is formed to define an outer tapered or frusto-conical surface 80 and an upper enlarged cylindrical portion 82 which are intersected by an annular shoulder surface 84. An annular valve seat element 86 is formed to define an external mating tapered surface 88 that is adapted to be received in close fitting engagement with respect to the tapered internal surface 80 of the flow passage. An annular sealing element 90 is received within an annular external groove 92 formed in the valve seat 86 and is adapted to establish a positive seal between the valve seat and the tapered surface 80. The valve seat is formed to define an enlarged inner portion 94 defining a generally cylindrical inner surface portion 96. The inner enlarged portion 94 of the valve seat cooperates with the tapered outer portion thereof to define an annular support shoulder 98 that engages the shoulder surface 84 of the valve body when the valve seat is properly seated with respect to the valve body. The valve seat is formed internally thereof to define a generally cylindrical flow passage 100 that is defined essentially by a generally cylindrical guide surface 102. The inner portion of the valve seat is also formed to define a seat surface 104 which may be of tapered or partially spherical configuration, as shown, or may take any other convenient form within the spirit and scope of this invention.

A valve element is provided as shown generally at 106 and incorporates a valve body structure 108 that is composed of metal or any other suitable essentially rigid material. An elongated connector projection 110 is formed integrally with the body structure 108 and extends inwardly toward the valve chamber 14 while a plurality of elongated valve guide elements 112 are also formed integrally with respect to the body structure 108 and extend outwardly therefrom. The guide elements 112 are formed externally to define guide surfaces 114 that are positioned in close fitting, guiding relationship with respect to the cylindrical guide surface 102. The minimum clearance that is maintained between the guide surface 102 and the guide surfaces 114 renders the valve element 106 stable as it moves with respect to the valve seat, prevents cocking of the valve element relative to the valve seat and ensures proper seating of the valve element with respect to the seat surface 104. The body portion 108 of the valve element is also formed to define an external partially spherical sealing surface 116 having a mating configuration as compared to the partially spherical seat surface 104.

The outer periphery of the valve element 106 is defined by a sealing insert 118 that is formed for close fitting relation with respect to the body portion 108 of the valve element. The sealing insert 118 is retained in assembly with the body structure 108 by means of an annular retainer plate 120 that entraps a portion of the sealing insert between the retainer plate and an annular surface 122. The retainer plate 120 is in turn retained with respect to the body structure 108 by means of retainer ring segments 124 that are maintained within a retainer groove 126 by means of a split retainer ring 128. The retainer ring 128 may be formed of any suitable spring-like material, such as spring steel, for example, and provides sufficient inwardly directed force on the retainer segments 124 to urge the retainer segments into the annular groove 126.

The sealing insert 118, which may be composed of any suitable sealing material, such as any one of a number of suitable synthetic polymers, for example, defines an external sealing portion 130 that forms a partially spherical sealing surface 132 for mating sealing relationship with respect to seat surface 104.

The sealing surface 132 is formed in contiguous relation with the spherical sealing surface 116 of the body structure 108 and therefore cooperates with the metal seat surface 104 of the valve seat 86 to define a yieldable seal capability as well as a metal-to-metal sealing capability.

It is desirable to provide the valve mechanism with the capability of establishing positive sealing regardless of the direction of flow or to establish check valve type valve actuation simply by manipulating the valve mechanism. In order to accomplish these features, the valve mechanism may conveniently take the form illustrated in FIGS. 1 and 2 where a lost-motion connection is established between the valve stem and valve element. The connector projection 110 of the body structure 108 is formed to define external threads 134 that are adapted to be received by internal threads 136 of a connector element 138. The connector element, which may be also referred to as a lift nut, defines a threaded bore 140 within which is received a set screw 142 that locks the connector element 138 in assembly with the connector projection 110. The connector element 138, in assembly with the connector projection 110, defines a stem connection chamber 144 within which is received a connector head portion 146 of the valve stem 140. Connector head portion 146 is interconnected with the valve stem 40 by means of an integral reduced diameter extension 148 which extends through an opening 150. The connector element 138 is also formed to define an internal shoulder structure 152 that is adapted to be engaged by a forcetransmitting shoulder 154 formed by the stem connector head 146. The length of the connector head extension 148 is sufficient to allow the connector head surface 156 to move into engagement with respect to the upper surface 158 of the connector projection 110. There is developed, therefore, a degree of lost-motion between the valve element 106 by virtue of the movable relation of the stem connector head 146 within its chamber or receptacle 144. This movable relationship of the connector element 138 relative to the valve stem 40 is clearly evident, especially in FIG. 1. With the valve stem 40 in the position shown in FIG. 1, fluid pressure applied to the valve element in a direction toward the valve chamber 14 will cause the valve element to become unseated and to move upwardly as shown in FIG. 1. The upward movement that is allowed is controlled by the amount of lost-motion that occurs as the surface 158 moves into contact with the stem head surface 156. In the event the valve mechanism is to be capable of functioning as a check valve or to relieve pressure surges or pressure increase due to fluid expansion, the valve stem 40 may be positioned as shown in FIG. 1. In the event it is desired to maintain the valve element 106 in the closed position thereof, the valve handle 48 is rotated sufficiently to drive the valve stem 40 downwardly, bringing surfaces 156 and 158 into abutment and thereby forcing the sealing surfaces 116 and 132 of the valve element into tight sealing engagement with respect to the seat surface 104. The valve mechanism, therefore, is adapted to be utilized in a check valve mode or utilized in a positive sealing mode simply upon proper positioning of the valve stem 40. In order to secure the valve stem 40 against possible movement from the position that is established, a valve lock element 160 is positioned within a lock passage and is brought into locking engagement with respect to the threaded portion 42 of the valve stem by means of a manually energized positioning screw 162. The valve stem 40 is therefore set in the described position and the thumb screw 162 is tightened, thereby bringing the locking the element 162 into binding relationship with respect to the threaded portion 42 of the valve stem.

The present invention therefore provides a valve mechanism having the capability of being utilized effectively in a check valve mode or a positive sealing mode simply by selective manipulation of the valve stem as desired. In the event the valve element 106 should be slammed into seating engagement with the metal seat surface 104, the sealing portion of the valve element will not be damaged by virtue of the supporting relationship that occurs as metal sealing surface 116 engages the seat surface 104. It is therefore apparent that the present invention is one well adapted to attain all of the objects and advantages hereinabove set forth, together with other advantages which will become obvious and inhrent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing frm the spirit or scope thereof, it is to be understood that all matters hereinabove set forth shown in the accompanying drawings are to be interpreted as illustrative in any limiting sense.

What is claimed is:

1. A high pressure globe and check valve mechanism for use in choke manifolds and the like, said valve mechanism comprising:

valve body means defining a generally culindrical valve chamber and forming inlet and outlet passage means intersecting in substantially normal relation, one of said inlet and outlet passage means being of tapered configuration and defining a seat stop shoulder;

valve stem means extending into said valve chamber and defining an enlarged head portion;

valve seat means within said valve body and defining a flow port in communication with said inlet and outlet passage means, said valve seat means being externally tapered and being received in tight fitting relation by said tapered passage, said valve seat means being sealed with respect to said tapered passage by resilient sealing means and defining external shoulder means seating against said stop shoulder means and annular seat surface means of partially spherical concave configuration;

a valve element being positioned within said valve chamber and being movable from a closed position where said valve element establishes sealing engagement with said valve seat means and blocks the flow of fluid through said flow port means, and an open position, where said valve element is in spaced relation with said valve seat means and flow of fluid through said flow port is allowed, said valve element defining a substantially spherical convex rigid sealing portion and a resilient outer peripheral sealing portion for sealing engagement with said seat surface, said valve element further defining an externally threaded connector stem being integral with said valve element;

lost-motion connection means defining an internal chamber receiving said enlarged head portion of said valve stem and a passage through which said valve stem extends in movable relation, said connection means further defining an internally threaded bore receiving said externally threaded connector stem, said connection means establishing a relatively movable interconnection between said valve element and said valve stem means, said valve element being selectively positionable in movable relation with said valve seat means and valve stem means for unidirectional flow check valve actuation and being selectively positionable in immovable relation with said valve seat means for blocking flow through said flow port in either direction;

retainer plate means overlying said resilient outer peripheral sealing portion; and retainer means maintaining said retainer plate means in said overlying relationship with said resilient outer peripheral sealing portion, said retainer means being secured in retaining relationship with said retainer plate means by said lost-motion connection means.

2. A high pressure globe and check valve mechanism as recited in claim 1, wherein:

lock means is provided on said stem connector element and is operative to retain said stem connection means and connector element in threaded assembly.

3. A high pressure globe and check valve mechanism as recited in claim 1, wherein:

said valve element define abutment means, said valve stem being movable into engagement with said abutment means with sufficient force to retain said valve element in seated relation with said valve.

4. A high pressure globe and check valve mechanism as recited in claim 1, wherein said valve mechanism includes:

means for selectively locking said valve stem against pressure responsive movement relative to said valve body.

5. A high pressure globe and check valve mechanism as recited in claim 1, wherein said valve element defines:

an annular metal sealing surface adapted for sealing engagement with an inner annular portion of said seat surface; and an annular, synthetic polymer sealing surface adapted for sealing engagement with an outer annular portion of said seat surface.

6. A high pressure globe and check valve mechanism as recited in claim 1, wherein:

said valve seat means is an annular ring-like seat structure formed externally to define a frusto-conical surface establishing a tight fitting relation within a corresponding frusto-conical surface of said valve body means, said seat structure being formed to define a flow passage communicating with said valve chamber, said seat structure being further formed to define a generally cylindrical internal valve guide surface; and said valve element includes a body structure having a plurality of guide elements extending therefrom, said guide elements each defining an external guide surface, said external guide surfaces being in close fitting, guiding relation with said internal guide surface of said seat structure.

7. A high pressure globe and check valve mechanism for use in choke manifolds and the like, said valve mechanism comprising:

valve body means defining a generally cylindrical valve chamber and forming inlet and outlet passage means in communication with said valve chamber and intersecting in substantially normal relation, one of said inlet and outlet passages being of frusto-conical configuration and defining a circular seat stop shoulder;

a valve stem extending into said valve chamber and being linearly movable within said valve chamber, said valve stem defining an enlarged head structure at the inner extremity thereof and a reduced diameter portion connecting said head portion to said valve stem;

circular globe valve seat means within said valve body and defining a flow port in communication with said inlet and outlet passage means and said valve chamber, said valve seat means defining a frusto-conical passage and having a circular shoulder engaging said seat stop shoulder, said valve seat means being in sealed relation with said valve body means and defining an annular concave seat surface and an inner cylindrical guide surface;

a globe type valve element being positioned within said valve chamber and being movable from a closed position where said valve element establishes sealing engagement with said valve seat means and blocks the flow of fluid through said flow port means, and an open position, where said valve element is in spaced relation with said valve seat means and flow of fluid through said flow port is allowed, said valve element defining a convex metal sealing surface and having a resilient outer peripheral annular sealing portion defining a concave sealing surface coextensive with said metal sealing surface, said valve element further defining an externally threaded connector stem formed integrally therewith and defining a plurality of projecting guide legs having guiding relation with said cylindrical guide surface;

a lost-motion connector element defining an internally threaded bore receiving said externally threaded connector stem in immovable threaded relation therein, said connector element being formed to define a stem head receptacle of greater dimension as compared to the thickness of said enlarged head of said valve stem and a stem opening receiving said reduced diameter portion of said valve stem in movable relation therein, said valve element being capable of linear movement relative to said head of said valve stem within limits defined by the relative dimensions of said thickness of said head and the dimension of said stem head receptacle;

retainer plate means overlying said resilient outer peripheral sealing portion; and retainer means maintaining said retainer plate means in said overlying relationship with said resilient outer peripheral sealing portion, said retainer means being secured in retaining relationship with said retainer plate means by said lost-motion connection means.

8. A high pressure globe and check valve mechanism as recited in claim 7, wherein:

lock means is provided on said stem connector element and is operative to retain said stem connection means and connector element in threaded assembly.

9. A high pressure globe and check valve mechanism as recited in claim 7, wherein:

said connector element defining a stem extension opening of restricted dimension and internal shoulder means; and said extension of said valve stem having close fitting relation with said stem extension opening.

10. A high pressure globe and check valve mechanism as recited in claim 7, wherein said valve mechanism includes:

means for selectively locking said valve stem against movement relative to said valve body.

11. A high pressure globe and check valve mechanism as recited in claim 7, wherein:

said seat means defines an annular seat surface and a flow passage communicating said one of said inlet and outlet passages with said valve chamber; and said valve element is of the globe type and defines external sealing means being engageable with said annular seat surface to establish a seal therewith and block the flow of fluid through said valve mechanism.

* * * * *